United States Patent [19]
Rosenwald et al.

[11] 3,782,585
[45] Jan. 1, 1974

[54] CONCAVE CLOSURE SEAL

[75] Inventors: Gary W. Rosenwald; Samuel C. Swift, both of Tulsa, Okla.

[73] Assignee: Cities Service Oil Company, Tulsa, Okla.

[22] Filed: Dec. 10, 1971

[21] Appl. No.: 206,846

[52] U.S. Cl.............................. 220/46 P, 220/82 R
[51] Int. Cl............................................. B65d 53/00
[58] Field of Search..................... 220/46 P, 46 MS, 220/46 R, 82 R

[56] References Cited
UNITED STATES PATENTS

| | | | |
|---|---|---|---|
| 2,483,156 | 9/1949 | Schmitz, Jr. | 220/46 R |
| 2,528,665 | 11/1950 | Peterson et al. | 220/46 MS |
| 2,725,252 | 11/1955 | Greer | 220/46 R X |
| 2,734,762 | 2/1956 | Aleck | 220/46 R X |
| 3,055,537 | 9/1962 | Watts | 220/46 R |
| 3,458,081 | 7/1969 | Sherman | 220/46 R |
| 3,462,041 | 8/1969 | Wilson | 220/46 R |
| 3,537,611 | 11/1970 | Lohrengel | 220/40 R X |

FOREIGN PATENTS OR APPLICATIONS

| | | | |
|---|---|---|---|
| 823,388 | 11/1959 | Great Britain | 220/46 MS |

*Primary Examiner*—William T. Dixson, Jr.
*Assistant Examiner*—James R. Garrett
*Attorney*—J. Richard Geaman

[57] ABSTRACT

An apparatus forming a closure seal especially adapted for utilization wherein high internal pressures are to be contained within a cylindrical high pressure cell. The closure seal is formed of a concave inner cylinder which readily transforms the pressures exerted within the cell to lateral forces which are exerted between the concave closure seal and the cylinder walls of the cell.

2 Claims, 3 Drawing Figures

3,782,585

CONCAVE CLOSURE SEAL

BACKGROUND OF THE INVENTION

The present invention relates to an apparatus for forming a high pressure seal. More particularly, the apparatus of the present invention provides a concave closure seal for utilization with cylindrical pressure cells.

High pressure seals inherently cause problems in which two or moremoving parts are difficult to seal due to differential expansion of the parts forming the seal. The differential expansion may be caused by pressure stresses, thermal stresses or any other means which tend to separate the two sealing surfaces from one another. Conventionally utilized seals, for example the O-ring, are often subject to failure when the clearance between two surfaces which are being separated by the seal increases, allowing the O-ring to extrude within the clearance and causing failure of the sealing mechanism.

What is required is a means for improving high pressure seals in order to adequately provide for pressure stresses, thermal stresses and other sealing surface failure.

It is an object of the present invention to provide a means for improving high pressure seals.

It is another object of the present invention to provide a closure clsoure seal for utilization with high pressure cylindrical cells.

With these and other objects in mind, the present invention may be more readily understood through referral to the accompanying figures and following discussion:

SUMMARY OF THE INVENTION

The objects of the presnt invention are provided through utilization of a concave closure seal which is applied in conjunction with a high pressure cylindrical cell. In general, the concave closure seal comprises an cylinder having an outside diameter approximately that of the inside diameter of a cylindrical cell and a concave end which is exposed to the interior of the cylindrical cell. In conjunction with the cylinder are means for sealing the outer circumferential surface of the cylinder from the inner circumferential surface of the cylindrical cell.

BRIEF DESCRIPTION OF THE DRAWINGS

The present invention may be more readily understood through referral to the accompanying figures in which.

DETAILED DESCRIPTION OF THE INVENTION

Figure 1:
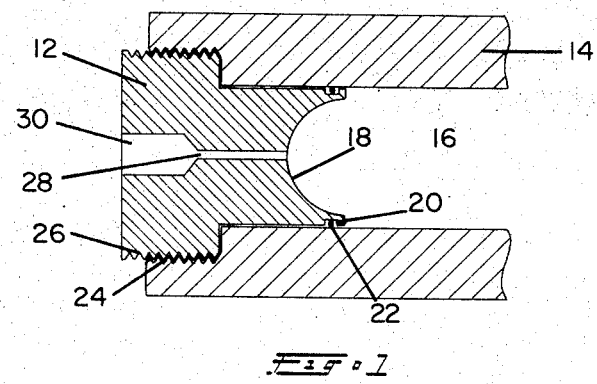
FIG. 1 represents preferred embodiment of the concave closure seal of the present invention depicting a concave closure seal for utilization in conjunction with a high pressure cylindrical cell.

As disclosed, the present invention is a concave closure seal to be utilized in conjunction with high pressure cylindrical cells. The various embodiments that the present invention may comprise are more readily understood by referral to the accompanying Figures. In particular, in FIG. 1, a closure seal is depicted wherein a cylindrical cell 14 is shown to have internally disposed a cylinder 12. The cylinder 12 is illustrated having an outside diameter approxiamtely that of the inside diameter of the cylindrical cell 14 and having a concave end 18 which is exposed to the interior of the cylindrical cell 16. Means are provided for sealing the outer circumferential surface of the cylinder 12 from the inner circumferential surface of the cylindrical cell 14. In general, the means for sealing these surfaces may be provided through the cylinder 12 having one or more grooves 20 reamed about the outer circumferential surface between the end of the cylinder 12, as exposed to the interior of the cylindrical cell 14, and the base of the concave surface 18. An O-ring 22 is positioned within each of the recesses 20 of the cylinder 12 to provide the sealing means wherein pressures exerted within the cylindrical cell are exposed to the concave surface 18 of the cylinder 12 so as to exert lateral pressures outwardly from the concave surface 18 in order to provide a sealing contact between the O-ring 22 and the inner circumferential wall of the cylindrical cell 14. In a preferred embodiment of the present invention, the closure seal is shown to have a sampling port 30 and sampling tube 28 reamed through the cylinder 12 such that samples in the liquid under pressure of the interior portion of the cylindrical cell 16 may be removed through the sampling tube 28 and sampling port 30 to lend a versatility to the apparatus of the present invention.

Figure 2:
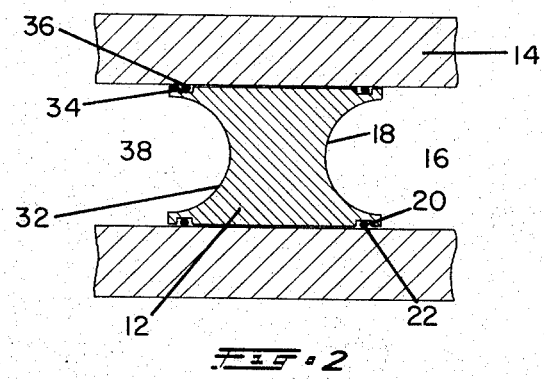
FIG. 2 represents a preferred embodiment of the concave closure seal of the present invention depicting its utilization as a piston sealing means.

Still another embodiment of the present invention is readily depicted in FIG. 2 in which a piston sealing means utilizing the concave closure seal of the present invention is illustrated. In particular, the cylindrical cell 14 has the cylinder 12 shaped in the form of a piston having a concave surface 18 on the inner surface of the piston and further comprising a second concave end 32 which is exposed to the interior 38 of the cylindrical cell 14. Additional means for sealing the outer circumferential surface of the cylinder 12 from the inner circumferential surface of the cylindrical cell 14 are also provided, comprising the cylinder having one or more grooves 34 reamed about its outer circumferential surace between the end of the cylinder 12, as exposed to the interior of the cylindrical cell 14, and the base of the concave surface 32. O-ring 36 is positioned within the groove 34 of the cylinder 12, as are the groove 20 and O-ring 22 on the opposite end of the cylinder to form the concave closure seal as already described in FIG. 1. If additional pressure differential is required, means for venting the volume between the seals at 22 and 36 can be provided.

One may readily discern the utilization of the piston seal disclosed in FIG. 2 wherein the O-ring provides a dual service of allowing compression thereof between the outer circumferential surface of the cylinder 12 and the inner circumferential surface of the cylindrical wall 14 and providing a lubricating means wherein the O-rings 22 and 36 form a contact between the walls of the cylinder and cylindrical cell such that the piston may laterally move within the cylindrical cell 14 through disproportionate pressuring of concave surfaces 18 and 32, respectively.

Figure 3:
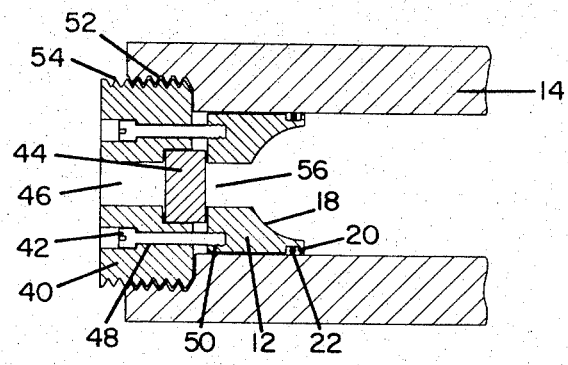
FIG. 3 represents a preferred embodiment of the concave closure seal of the present invention in which the seal is utilized as a glass compression seal as, for example in a windowed pressure cell.

FIG. 3 represents a preferred embodiment of the present invention in which the concave closure seal is utilized in combination with a glass compression seal in order to provide a windowed cell arrangement. The cylindrical cell 14 contains an end plug 40 turned within internal threads 52 of the cylindrical cell 14 and meshing with the external threads 54 of the end plug 40. The cylinder 12 is positioned so as to face the concave surface 18 within the cylindrical cell 14 and is provided with groove 20 and O-ring 22 so as to form the compression seals required to seal the outer circumferential surface of the cylindrical cell 14. A further provision of the high pressure cell is the placement of a site glass 44 between the end plug 40 and the cylinder 12, the site glass being ridigly retained by retaining screws 42 passing within holes 48 of the end plug 40 and being internally meshed with internal threads of holes 50 and two or more holes 50 contained within the cylinder 12. The site glass 44 is further aligned with holes 46 and 56 contained within the end plug 40 and cylinder 12, respectively. The holes are axially aligned so as to provide a view of site through the holes and the site glass 44 to the interior of the cylindrical cell 14, allowing for visual observation of the phase equilibria or reactions occurring within the cylindrical cell 14. In general, the site glass will have a diameter greater than the diameter of the holes 46 and 56 of the end plug 40 and cylinder 12, respectively, and will be positioned so as to have its center aligned with the centers of the holes of the cylinder and end plug and rigidly positioned between the end plug 40 and the cylinder 12 by the retaining screws 42.

Therefore, the present invention provides a means wherein two surfaces may experience the same or greater proximity as the internal pressure is increased within a cyindrical cell. The particular design of the cylinder concave surface and materials of construction of the present invention may be based on any acceptable mathematical formula relating the strain at the outer radius of the cylinder to the internal pressure. For example, Lamb's thick wall cylinder relation and Hook's Law may be utilized for the construction design of the apparatus of the present invention. This relationship is then utilized to determine the amount of material to be removed from the cylinder to obtain a desired expansion coefficient for the pressures experienced within the cylindrical cell. For example, a fixed seal design should allow excess expansion of the cylinder while sliding seals, for example the piston shown in FIG. 2, should utilize an expansion equal to that of the outer cylinder so as to provide an exacting seal at all times for unobstructed movement of the piston within the cylinder. Therfore, the apparatus of the present invention provides a means for improving high pressure seals wherein extended seal life and failsafe operation may be obtained.

While the invention has been described above with respect to certain embodiments thereof, it will be understood by those skilled in the art that various changes and modifications may be made without departing from the spirit and scope of the invention as set forth herein.

Therefore, we claim:

1. A concave closure seal for utilization in conjunction with high pressure cylindrical cells comprising a cylindrical cell being internally threaded at an end, a cylinder having an outside diameter approximately that of the inside diameter of the cylindrical cell and having a concave end which is exposed to the interior of the cylindrical cell, said cylinder having one or more grooves about it's outer circumferential surface between that end of the cylinder exposed to the interior of the cylindrical cell and the concave surface thereof, and an axial opening in said cylinder having its center approximately coaxial with the axis of said cylinder and a plurality of internally threaded holes situated approximately equidistant from the axis of said cylinder on the exterior end of the cylinder, an O-ring positioned within each of the grooves of the cylinder, an exterally threaded end plug threaded within the end of said internal threads of said cylindrical cell, said end plug having an opening whose center is approximately co-axial with the axis of said cylinder and a plurality of holes situated approximately equi-distant from the axis of said cylinder, said end plug holes traversing the entire structure of said end plug, and two or more retaining screws passing through said end plug holes and caused to mesh with said internal threads of said holes in the exterior of said cylinder.

2. The concave closure seal of claim 1 wherein said end plug additionally includes a counterbore concentric with and having a radius larger than said end plug opening and less than the equi-distances of said end plug holes from said axis of said cylinder, a site glass having a diameter greater than the diameter of said opening of said cylinder and said opening of said end plug, and less than the diameter of said counterbore of said end plug, said site glass being positioned within said counterbore of said end plug and between said end plug and said cylinder so as to have its center approximately axially aligned with the centers of said opening of said cylinder and said opening of said end plug.

* * * * *